W. Beaty.
Potato Digger.
No. 87,901. Patented Mar. 16, 1869.
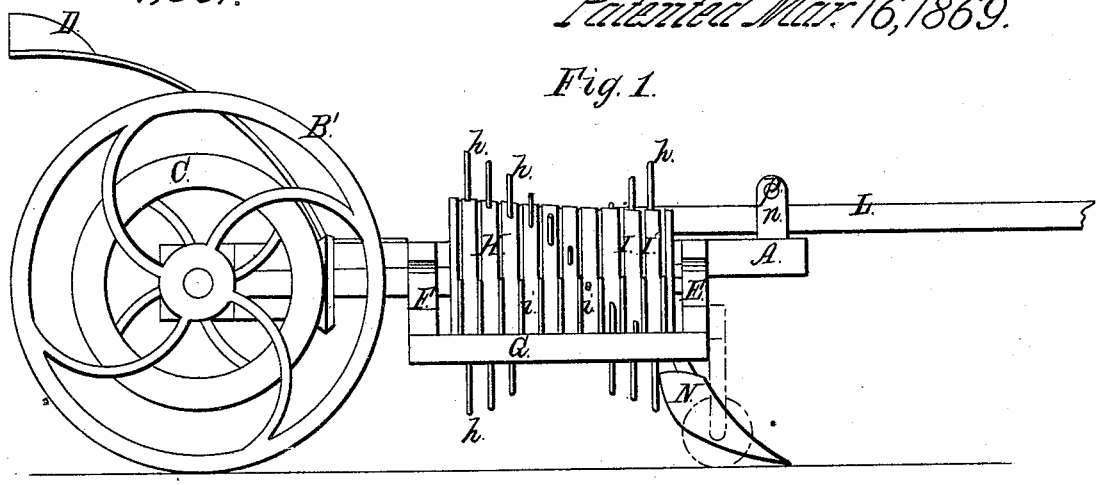
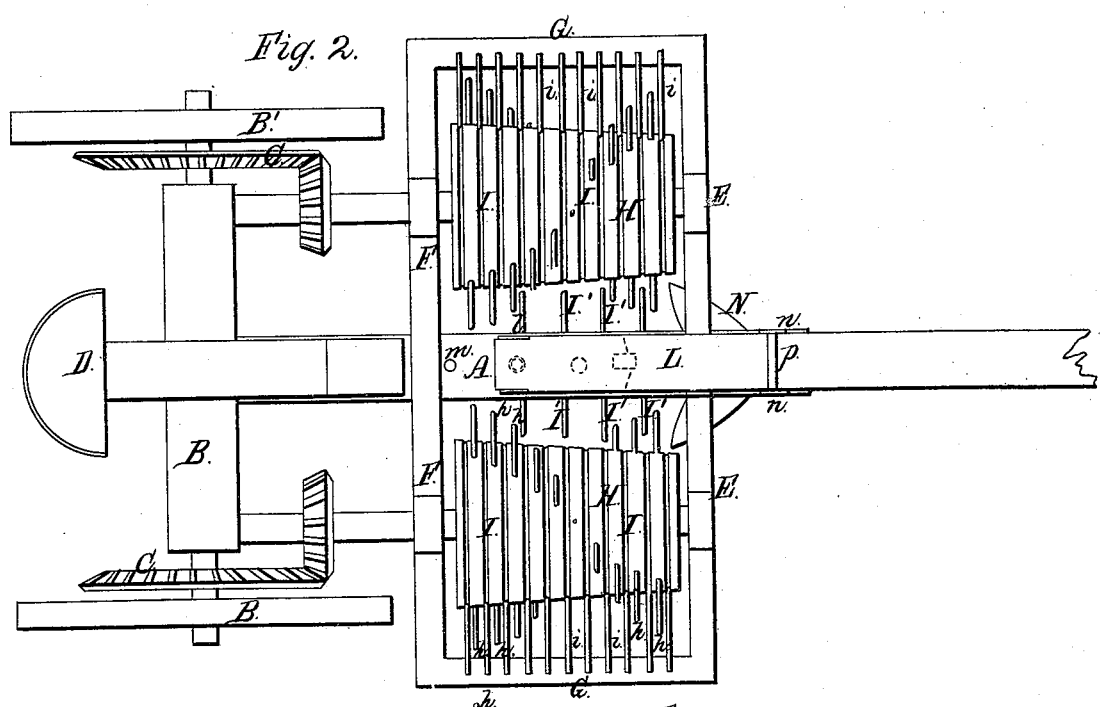
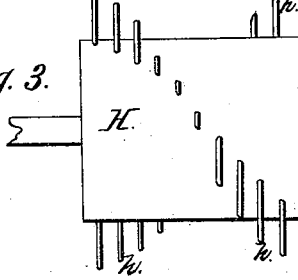
Witnesses.
Edward Mass
Daniel Breed
Inventor.
Wm Beaty
Per T. A. Connolly
Atty.

WILLIAM BEATY, OF PONTIAC, MICHIGAN.

Letters Patent No. 87,901, dated March 16, 1869.

IMPROVEMENT IN POTATO-DIGGERS.

The Schedule referred to in these Letters Patent and making part of the same.

*To all whom it may concern:*

Be it known that I, WILLIAM BEATY, of Pontiac, in the county of Oakland, and State of Michigan, have invented a new and improved Potato-Digger; and I do hereby declare the following to be a full, clear, and exact description thereof, reference being had to the accompanying drawings, forming part of this specification.

The main, and most important feature of this potato-digger is a pair of horizontal parallel rollers, armed with teeth, and journalled, to revolve in opposite directions in a frame-work directly in front of the main driving-wheels, and are operated by means of said wheels through suitable gearing, as hereafter to be shown.

The said rollers are preceded by a plow, also attached to the machine, which opens the ground, after which the teeth of the rollers gather the potatoes in a ridge between them.

In the drawings—

Figure 1 is a side elevation,

Figure 2 is a plan view, and

Figure 3 is a representation of a modified form of toothed roller.

A shows the centre-pole of said potato-digger, attached to the rear end of which is the cross-bar, or axle, B, on the ends of which are the driving-wheels, B', and also, attached rigidly to the hub, or finer face of the driving-wheels, the bevel-gear wheels C.

D is the driver's seat, suitably elevated between the driving-wheels, on the spring-support D', bolted or screwed to the centre-pole A.

Extending on both sides of and connected with the centre-pole A, is shown the frame-work, consisting of the cross-bars E F and side bars G, the same being directly in front of the driving-wheels B'.

On each side of and journalled within the frame-work above mentioned, are the rollers H, either conical or cylindrical in form, and armed with one or more rows of teeth, $h$, curved or straight, ranged spirally, as shown, around the rollers.

I are grooves formed around the surface of the said rollers, within which grooves rest the inner, or face-ends of the inwardly-curved tines, $i$, the other ends of which are inserted at equal distances apart, in the outer bars G of the before-described frame-work.

The forward ends of the roller-shafts H' have their bearings in the cross-bar E, near the forward end of the machine, while the rear ends have their bearings in the axle B, near the wheels B'.

K are bevel-pinions on the roller-shafts, near their rear ends, gearing with the wheels C, through the operation of which motion is communicated to the rollers H, so that when the machine is drawn forward, the rollers shall revolve in the direction indicated by the arrows on the drawings, thus gathering the potatoes, after they have been plowed up, into a ridge between them.

The centre-pole A is provided with a plow, N, standing directly in front of the rollers, or on a line with their forward ends, of any desired kind to answer the required purpose, which is to open the potato-ridges and raise the potatoes out of the earth, so that as the plow throws them to the side or sides, the rollers following will loosen the earth and gather the potatoes in a centre ridge, as before mentioned.

The teeth on the rollers being ranged in spiral order, have more force and are better adapted to the purpose for which they are employed, than if arranged in any other manner.

The tines $i$ are designed to remove any earth, grass, potato-tops, &c., that are apt to collect around and clog the roller-teeth, while the bars G, in which they are inserted, serve as guards to prevent the roller-teeth coming in contact with any obstacle which would be liable to injure or impede the progress of the same.

I' are tines attached to the centre-pole A, and extending towards the rollers H, between the teeth, to remove the potatoes from the vines, in case they should remain attached.

When desired, the teeth on the rollers may be sharpened and pointed, and especially if the machine be used as a cultivator, for which it can be well adapted. In such case the plow should be removed, and one or more caster, or other suitable wheels attached to the cross-bar E, or centre-pole of the machine.

It can also be used for harrowing, sowing grain or grass-seed, plaster, &c., in which case one more wheel, in connection with the driving-wheels, will only be necessary.

When used other than as a potato-digger, the roller-shafts may be lengthened, and the pinions placed behind the axle, so that the rollers will not gather the earth into a centre ridge.

L is the tongue, provided at the rear end with any desired hinge, or equivalent, $l$, having a projecting point which can be inserted in the holes $m$, bored in the centre-pole.

The forward end of the tongue, or any part thereof, may then rest between the standards $n$, on the forward end of the pole, and have a pin, $p$, inserted to retain it.

A clevis may also be attached to the forward end of the centre-pole, to which the horses are hitched, the tongue being used principally in backing.

What I claim as my invention, and desire to secure by Letters Patent, is—

1. The rollers H and teeth $h$, in combination with the driving-wheels B', all arranged and operating substantially as and for the purpose set forth.

2. The tines I', as and for the purpose specified.

3. In combination with the rollers H, the tines $i$ and bar G, as described, and for the purpose set forth.

4. In combination with the rollers H, arranged as specified, the plow N, as and for the purpose described.

5. Providing an adjustable tongue, L, in combination with the parts above claimed, as described.

6. The combination of all the parts above claimed.

WM. BEATY.

Witnesses:
 THOS. A. CONNOLLY,
 EDW. P. MASI.